US00RE43904E

(19) United States
(12) Reissued Patent
Allen

(10) Patent Number: US RE43,904 E
(45) Date of Reissued Patent: Jan. 1, 2013

(54) MEDICAL BENEFITS PAYMENT SYSTEM

(75) Inventor: Robert Allen, Richardson, TX (US)

(73) Assignee: StoneEagle Services, Inc., Richardson, TX (US)

(21) Appl. No.: 13/358,620

(22) Filed: Jan. 26, 2012

Related U.S. Patent Documents

Reissue of:
(64) Patent No.: 7,792,686
Issued: Sep. 7, 2010
Appl. No.: 11/566,930
Filed: Dec. 5, 2006

(51) Int. Cl.
*G06Q 10/00* (2006.01)
(52) U.S. Cl. ..... 705/2; 709/200; 235/380; 705/17
(58) Field of Classification Search ..... 705/2
See application file for complete search history.

(56) References Cited

U.S. PATENT DOCUMENTS

| | | | |
|---|---|---|---|
| 6,188,766 | B1 | 2/2001 | Kocher |
| 6,343,310 | B1 | 1/2002 | DiRienzo |
| 6,901,387 | B2 | 5/2005 | Wells et al. |
| 7,072,842 | B2 | 7/2006 | Provost et al. |
| 7,229,011 | B2 | 6/2007 | Hansen et al. |
| 7,246,068 | B2 | 7/2007 | Thomas, Jr. |
| 7,383,223 | B1 | 6/2008 | Dilip et al. |
| 7,434,729 | B2 | 10/2008 | Cracchiolo et al. |
| 7,590,557 | B2 | 9/2009 | Harrison et al. |
| 7,792,686 | B2 | 9/2010 | Allen |
| 7,792,749 | B2 | 9/2010 | Ganesan |
| 7,853,524 | B2 | 12/2010 | Kight et al. |
| 7,958,049 | B2 | 6/2011 | Jamison et al. |
| 2002/0077837 | A1 | 6/2002 | Krueger et al. |
| 2004/0172312 | A1 | 9/2004 | Selwanes et al. |
| 2005/0086075 | A1 | 4/2005 | Kaehler et al. |
| 2005/0108153 | A1 | 5/2005 | Thomas et al. |
| 2005/0122953 | A1 | 6/2005 | Ilic |
| 2005/0209964 | A1 | 9/2005 | Allen et al. |
| 2007/0005402 | A1 | 1/2007 | Kennedy et al. |
| 2007/0168283 | A1 | 7/2007 | Alvarez et al. |
| 2008/0010096 | A1 | 1/2008 | Patterson et al. |
| 2008/0140447 | A1 | 6/2008 | Pourfallah et al. |
| 2008/0281641 | A1 | 11/2008 | Pilzer et al. |
| 2009/0037333 | A1 | 2/2009 | Flitcroft et al. |
| 2010/0030580 | A1 | 2/2010 | Salwan |
| 2010/0185466 | A1 | 7/2010 | Paradis et al. |
| 2011/0087598 | A1 | 4/2011 | Bozeman |
| 2011/0178816 | A1 | 7/2011 | Lee et al. |
| 2011/0184857 | A1 | 7/2011 | Shakkarwar |

OTHER PUBLICATIONS

Brousseau, "IBML and the Move Toward Healthcare Electronification", Today, TAWPI, Mar./Apr. 2009, pp. 8-10.
Baker, "Persistence Pays When Posting Payments", Lockbox Payments, Today, TAWPI, Nov./Dec. 2009, pp. 22-23.

*Primary Examiner* — Hiep V Nguyen
(74) *Attorney, Agent, or Firm* — Anton J. Hopen; Andriy Lytvyn; Smith & Hopen, P.A.

(57) ABSTRACT

A method of facilitating payment of health care benefits to on behalf of a payer comprising the step of electronically transmitting a stored-value card account payment of the authorized benefit amount concurrently with an explanation of benefits.

26 Claims, 4 Drawing Sheets

FIG. 1 (*prior art*)

Fig. 4

Tran Nbr: EBS T000000025

ABC Company
123 MAIN ST.
DALLAS TX 75000

Date 10/18/06
Amount $******1.74

Attention:
ROBERT ALLEN

To the Order of

ALLEN MEDICAL
7136 S. YALE AVE
TULA OK, 74137 sw 166
5205 4350 0000 0166
valid thru 11/06
TALON

This is a one-time use stored value card. It cannot be overcharged and will not allow additional charges. All transactions will be tracked and audited.

If you have any questions or require assistance, please contact the administrator.

If you are not the intended recipient noted on the left side of this form, please contact us immediately at (999) 555-1211.

ABC COMPANY
123 MAIN ST.
DALLAS, TX 75000-
(999) 555-1211 (999) 555-1212 (FAX)

EXPLANATION OF BENEFITS
FOR
ALLEN MEDICAL
12-3456789 003
PROVIDER SUMMARY

Group Name TEST
Page : 1
Date Paid : 10/18/06
Group # : TEST
Division # :
Plan # : TEST
PPO:
Total Remittance 1.74

| DATES OF SERVICE | CPT CODE | TYPE OF SERVICE | TOTAL SUBMITTED CHARGES | less INELIGIBLE AMOUNT | CD | PROVIDER DISCOUNT | less PARTICIPANT DEDUCT | COPAY | CO-INS | % | TOTAL BENEFIT PMT. |
|---|---|---|---|---|---|---|---|---|---|---|---|
| PATIENT ACCOUNT # : | | | PATIENT: JAMES TEST | | | | | CLAIM# : 1234567890 1XXX0051 | | | |
| 1 01/02 - 01/02/01 | 99213 | OFFICE VISIT PHYSI | 0.25 | 0.00 | A2 | 0.00 | 0.25 | 0.00 | 0.00 | | 0.00 |
| INSURED: JAMES TEST | | 123-45-6789 | 0.25 | 0.00 | | 0.00 | 0.25 | 0.00 | 0.00 | | 0.00 |
| PATIENT RESPONSIBILITY: | | 0.25 | | | | | | | | | |
| PATIENT ACCOUNT # : | | | PATIENT: JAMES TEST | | | | | CLAIM# : 1234567890 1XXX0050 | | | |
| 1 10/12 - 10/12/06 | 99213 | OFFICE VISIT PHYSI | 0.25 | 0.00 | A2 | 0.00 | 0.00 | 0.00 | 0.05 | 0.20 | 0.20 |
| 2 10/12 - 10/12/06 | 99213 | OFFICE VISIT PHYSI | 0.26 | 0.00 | A2 | 0.26 | 0.00 | 0.00 | 0.00 | | 0.00 |
| *P.P.O. DISCOUNT MAY NOT BE BALANCE BILLED | | | | | | | | | | | |
| 3 10/12 - 10/12/06 | 99213 | OFFICE VISIT PHYSI | 0.27 | 0.00 | A2 | 0.00 | 0.00 | 0.00 | 0.05 | 0.20 | 0.22 |
| 4 10/12 - 10/12/06 | 99213 | OFFICE VISIT PHYSI | 0.28 | 0.00 | A2 | 0.00 | 0.00 | 0.00 | 0.06 | 0.20 | 0.22 |
| 5 10/12 - 10/12/06 | 99213 | OFFICE VISIT PHYSI | 0.28 | 0.00 | A2 | 0.00 | 0.00 | 0.00 | 0.06 | 0.20 | 0.22 |
| 6 10/12 - 10/12/06 | 99213 | OFFICE VISIT PHYSI | 0.28 | 0.00 | A2 | 0.00 | 0.00 | 0.00 | 0.06 | 0.20 | 0.22 |
| 7 10/12 - 10/12/06 | 99213 | OFFICE VISIT PHYSI | 0.28 | 0.00 | A2 | 0.00 | 0.00 | 0.00 | 0.06 | 0.20 | 0.22 |
| 8 10/12 - 10/12/06 | 99213 | OFFICE VISIT PHYSI | 0.28 | 0.00 | A2 | 0.00 | 0.00 | 0.00 | 0.06 | 0.20 | 0.22 |
| 9 10/12 - 10/12/06 | 99213 | OFFICE VISIT PHYSI | 0.28 | 0.00 | A2 | 0.00 | 0.00 | 0.00 | 0.06 | 0.20 | 0.22 |
| 10 01/01 - 01/01/01 | 99213 | OFFICE VISIT PHYSI | 0.29 | 0.00 | A2 | 0.00 | 0.29 | 0.00 | 0.00 | | 0.00 |
| 11 01/01 - 01/01/01 | 99213 | OFFICE VISIT PHYSI | 0.30 | 0.00 | A2 | 0.00 | 0.30 | 0.00 | 0.00 | | 0.00 |
| 12 01/01 - 01/01/01 | 99213 | OFFICE VISIT PHYSI | 0.30 | 0.00 | A2 | 0.00 | 0.30 | 0.00 | 0.00 | | 0.00 |
| 13 01/01 - 01/01/01 | 99213 | OFFICE VISIT PHYSI | 0.30 | 0.00 | A2 | 0.00 | 0.30 | 0.00 | 0.00 | | 0.00 |
| 14 01/01 - 01/01/01 | 99213 | OFFICE VISIT PHYSI | 0.30 | 0.00 | A2 | 0.00 | 0.30 | 0.00 | 0.00 | | 0.00 |
| 15 01/01 - 01/01/01 | 99213 | OFFICE VISIT PHYSI | 0.30 | 0.00 | A2 | 0.00 | 0.30 | 0.00 | 0.00 | | 0.00 |
| 16 01/01 - 01/01/01 | 99213 | OFFICE VISIT PHYSI | 0.30 | 0.00 | A2 | 0.00 | 0.30 | 0.00 | 0.00 | | 0.00 |
| 17 01/01 - 01/01/01 | 99213 | OFFICE VISIT PHYSI | 0.30 | 0.00 | A2 | 0.00 | 0.30 | 0.00 | 0.00 | | 0.00 |
| 18 01/01 - 01/01/01 | 99213 | OFFICE VISIT PHYSI | 0.30 | 0.00 | A2 | 0.00 | 0.30 | 0.00 | 0.00 | | 0.00 |
| 19 01/01 - 01/01/01 | 99213 | OFFICE VISIT PHYSI | 0.30 | 0.00 | A2 | 0.00 | 0.30 | 0.00 | 0.00 | | 0.00 |
| 20 01/01 - 01/01/01 | 99213 | OFFICE VISIT PHYSI | 0.30 | 0.00 | A2 | 0.00 | 0.30 | 0.00 | 0.00 | | 0.00 |

MEDICAL BENEFITS PAYMENT SYSTEM

Matter enclosed in heavy brackets [ ] appears in the original patent but forms no part of this reissue specification; matter printed in italics indicates the additions made by reissue.

*This reissue application has been filed for the reissue of U.S. patent application Ser. No. 11/566,930, filed Dec. 5, 2006 now U.S. Pat. No. 7,792,686 entitled "Medical Benefits Payment System" naming Robert M. Allen as inventor, the disclosure of which is incorporated by reference.*

FIELD OF INVENTION

This invention relates to facilitating payments for medical benefits, and more specifically to streamline the payment of health care providers by administrators and insurance carriers that handle claims adjudication and payment to these providers.

BACKGROUND OF THE INVENTION

Third party administrators, insurance companies, and large self-funded corporations (herein "Payers") adjudicate claims, compare them to the benefit plan and make the decision to write checks in payment for the claims. Currently, Payers are required to print checks and explanation of benefit (EOB) forms for delivery to the health care providers. The EOB lists the amount the health care provider billed the Payer's company and the amount the Payer's company paid on the claim. It may also list the contractual discount amount and the patient responsibility. If the claim is denied, the EOB will explain the reason for denial. It has been estimated that the check and EOB forms cost Payers approximately $4.50 each.

[The] *This creates* inefficiencies [to] *for* all Payers that must coordinate payment for medical services[. This includes], *including*, but [is] not limited to, insurance carriers, government entities, and non-profit organizations.

A long-felt but unfulfilled need in the art is a system to reduce the transactional costs incurred by the payers and speed up the delivery and funding of payments by weeks.

SUMMARY OF INVENTION

The present invention is a method of facilitating payment of health care benefits to a health care provider on behalf of a Payer, often an insurance company, government organization or self-insured entity. An embodiment of the invention includes the step of electronically transmitting a stored-value card account payment of the authorized benefit amount concurrently with an explanation of benefits. For the purposes of this patent specification, stored-value cards and stored-value card accounts shall also include financial instruments known as credit cards, debit cards and EFT cards.

A credit card system is a type of retail transaction settlement and credit system, named after the small plastic card issued to users of the system. A credit card is different from a debit card in that it does not remove money from the user's account after every transaction. In the case of credit cards, the issuer lends money to the consumer (or the user).

A debit card account provides an alternative payment method to cash when making purchases. When issued in physical form, the card is a ISO 7810 card like a credit card, however its functionality is more similar to writing a check as the funds are withdrawn directly from the cardholder's bank account; some cards are referred to as check cards.

A stored-value card represents money on deposit with the issuer, and is similar to a debit card. One major difference between stored value cards and debit cards is that debit cards are usually issued in the name of individual account holders, while stored value cards are usually anonymous.

The stored-value card account payment generally includes a card number with the pre-funded amount, a card verification value code and an expiration date. The payment and explanation of benefits may be transmitted by a number of methods including, but not limited to, fax, SMTP, SMS, MMS, HTTP, HTTPS, and FTP. The electronic transmission may include an electronically computer-generated image of a physical debit card and the unique debit card number is associated with a single benefit payment.

Paid benefits charged to the associated debit card transaction may be reconciled via the unique card number generated and assigned to a single payment. In addition, the debit card is pre-funded only to the authorized benefit amount. Thus [is] it *is* not possible to charge more than the authorized benefit amount. Furthermore, the stored-value card account payment may only be charged through a medical services terminal. The terminal may be coupled to a computer-implemented communications network as is known in the art for credit and debit card transactions.

Another embodiment includes a method of facilitating payment of health care benefits to a health care provider including the steps of identifying the health care provider that renders medical services in anticipation of payment; identifying a payer that has agreed to pay the health care provider on behalf of a patient subject to preselected conditions; identifying an administrator that determines whether the medical services conducted by the service provider meet the preselected conditions by the payer, generates an explanation of benefits, and arranges for payment of the service provider if appropriate; intercepting the explanation of benefits and payment information transmitted from the administrator to the health care provider; acquiring a stored-value card account number for the amount of the check; merging the stored-value card account number with the explanation of benefits into an image file; and transmitting the image file to the health care provider. The image file may be transmitted by a number of methods including, but not limited to, fax, SMTP, SMS, MMS, HTTP, HTTPS, and FTP. The transmission may be implemented using a computer coupled to a network connection such as known in the art and required for transmissions such as FTP, HTTP, and the like.

The charge incurred against the stored-value card account number may be reconciled to confirm the health care provider has been paid for the services approved by the administrator. As an added security precaution, the stored-value card account number is chargeable only through a medical services terminal.

BRIEF DESCRIPTION OF THE DRAWINGS

For a fuller understanding of the invention, reference should be made to the following detailed description, taken in connection with the accompanying drawings, in which:

FIG. 4 is an image of a merged EOB and stored-value card account payment according to an embodiment of the invention.

DETAILED DESCRIPTION OF THE PREFERRED EMBODIMENT

Figure 1:
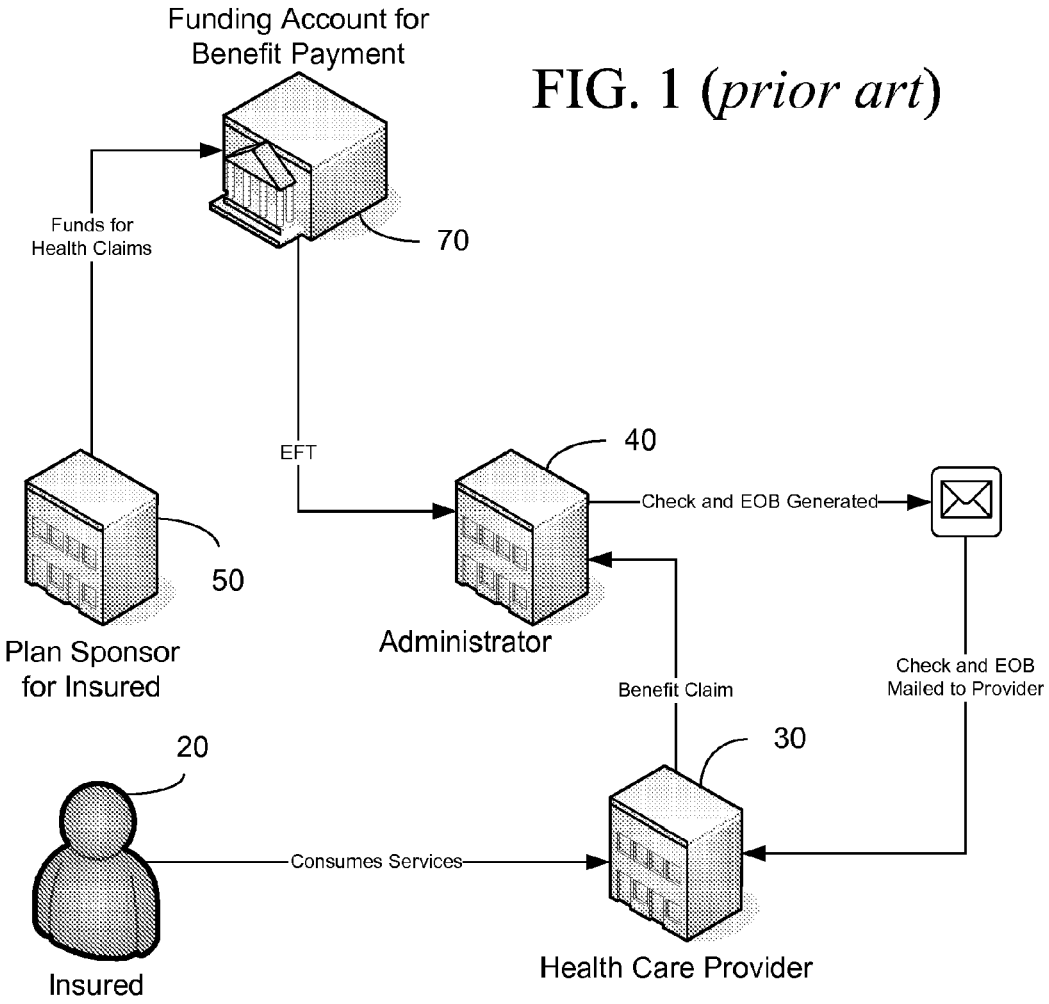
FIG. 1 (prior art) is an illustration of the current state-of-the-art.

Turning to FIG. 1 (prior art), insured patient 20 consumes services from health care provider 30. Health care provider 30 submits a benefit claim to administrator 40 in order to receive payment. Administrator 40 may be a third party administrator, insurance company government entity, non-profit organization or the like. For the purposes of this specification, administrator 40 is considered any entity that adjudicates claims, compares them to the benefit plan and makes the decision to make payment for the services. Administrator 40 evaluates the claim made by health care provider 30 to determine whether all or a portion of the benefit claim is payable under the terms of the relevant policy issued by payer or plan sponsor (herein "payer"). 50. Payer 50 funds funding account 70 in anticipation of benefit claims. If administrator 40 finds that a benefit claim is payable, it draws the money from funding account 70. Administrator 40 then generates an explanation of benefits and a check for the benefit payment. The explanation of benefits and check are then sent concurrently to health care provider 30. Drawbacks associated with the prior art include the cost and time associated with generating hardcopy checks and sending them by mail to health care provider 30. A long-felt but unfulfilled need exists in the art to reduce this transactional cost and speed up payment of benefits to health care provider 30.

Figure 2:
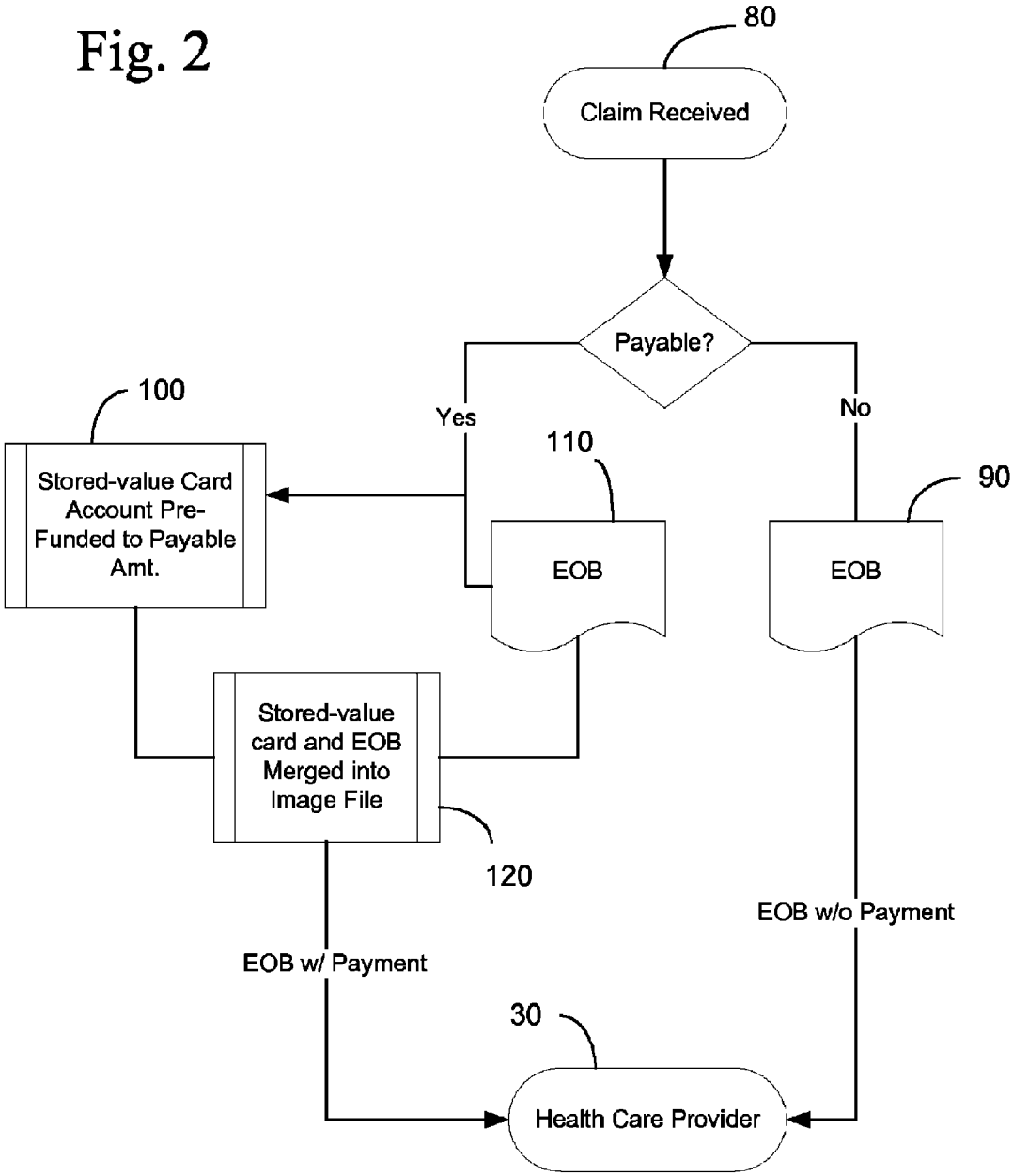
FIG. 2 is a flow-chart illustration of an embodiment of the invention.

In FIG. 2, claim 80 is received. Claim 80 is then evaluated to determine whether it is payable under the terms of an applicable policy. If claim 80 is not even partially payable, then non-payment EOB 90 is generated and transmitted to health care provider 30 without payment. However, if claim 80 is at least partially payable, then stored-value card account 100 is loaded with funds equal to the amount of the payable benefit. Payment EOB 110 is merged with stored-value card account 100 to generate image file 120. Image file 120 includes payment EOB 110 and a computer-generated facsimile of a physical stored-value card complete with the card number, expiration date and security verification code. Image file 120 is transmitted to health care provider 30 by a suitable transmission medium including, but not limited to, fax, SMTP, SMS, MMS, HTTP, HTTPS, and FTP.

Figure 3:
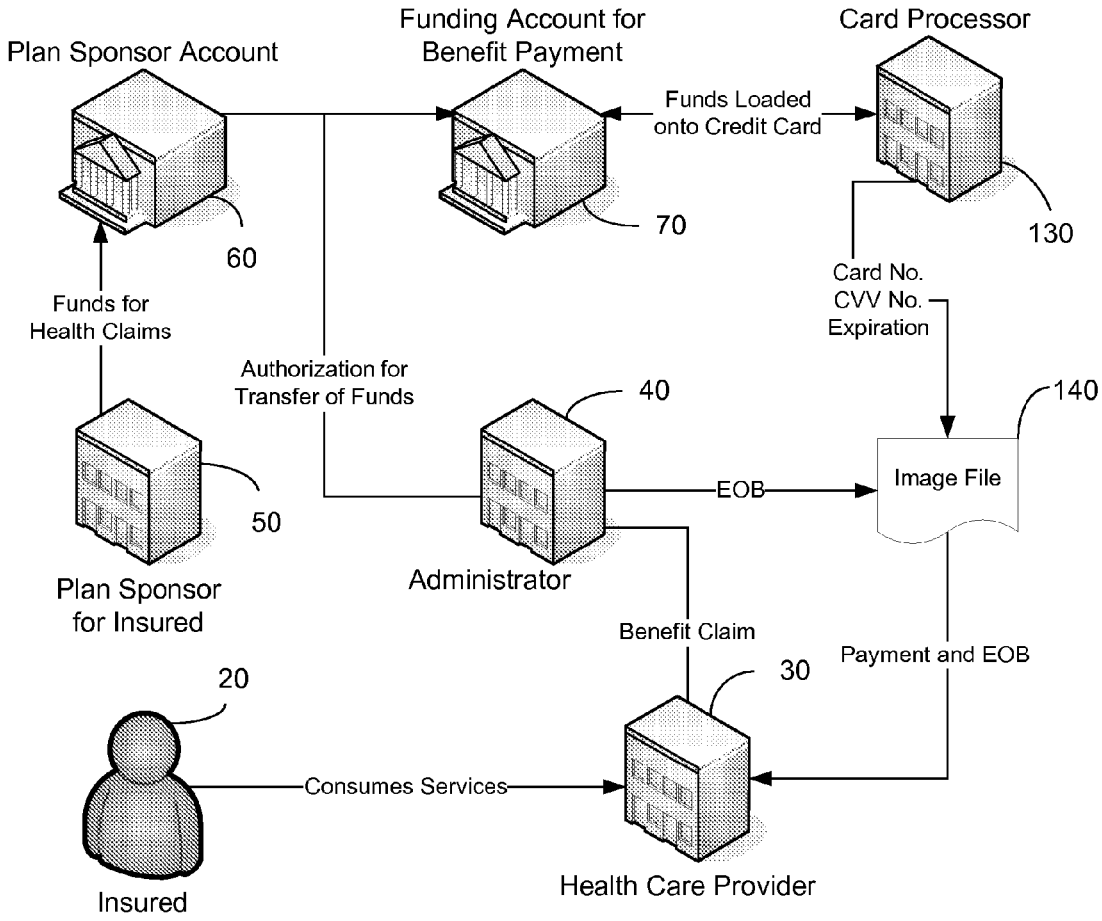
FIG. 3 is a diagrammatic view of an embodiment of the invention.

In FIG. 3, insured 20 having coverage provided by payer 50 consumes services by health care provider 30. Health care provider 30 then submits a benefit claim to administrator 40 which adjudicates the benefit claim in accordance with pre-existing guidelines. If payment is appropriate on the benefit claim, a transfer of funds is made between payer's account 60 and its funding account 70 (to which administrator 40 has access). Stored-value card processor 130 then loads funds from funding account 70 onto a stored-value card account. The stored-value card account is chargeable only on a medical services terminal and it cannot be charged over the amount loaded onto it. The card number, the security verification code and the expiration date of the debit card account are merged with the explanation of benefits generated by administrator 40 into image file 140 which is then transmitted back to health care provider 30.

FIG. 4 illustrates an exemplary embodiment of a merged EOB and stored-value card account payment.

It will be seen that the advantages set forth above, and those made apparent from the foregoing description, are efficiently attained and since certain changes may be made in the above construction without departing from the scope of the invention, it is intended that all matters contained in the foregoing description or shown in the accompanying drawings shall be interpreted as illustrative and not in a limiting sense.

It is also to be understood that the following claims are intended to cover all of the generic and specific features of the invention herein described, and all statements of the scope of the invention which, as a matter of language, might be said to fall therebetween. Now that the invention has been described,

What is claimed is:

1. A method of facilitating payment of adjudicated health care benefits to a health care provider on behalf of a payer comprising the steps of:

loading a unique, single-use, stored-value card account with an amount equal to a single, authorized benefit payment, the card account only chargeable through a medical services terminal;

generating an explanation of benefits associated with the payment;

creating a computer-generated image file containing the stored-value card account number, the amount, a card verification value code, an expiration date, and the explanation of benefits;

transmitting the image file by fax to the health care provider; and reconciling the charged card account to confirm that the health care provider has received payment.

2. A method of facilitating payment of adjudicated health care benefits to a health care provider comprising:

identifying the health care provider that renders medical services in anticipation of payment;

identifying a payer that has agreed to pay the health care provider on behalf of a patient subject to preselected conditions;

identifying an administrator that determines whether the medical services conducted by the service provider meet the preselected conditions by the payer, generates an explanation of benefits, and authorizes payment of the service provider for an authorized amount;

intercepting the explanation of benefits and payment information transmitted from the administrator to the health care provider;

acquiring a single-use, stored-value card account number and loading it with funds equal to the authorized amount;

merging the stored-value card account number, the authorized amount, a card verification value code, and an expiration date with the explanation of benefits into a computer-generated image file; and transmitting the image file to the health care provider via a computer-implemented transmission.

3. The method of claim 2 wherein the image file is transmitted by fax.

4. The method of claim 2 further comprising the step of reconciling the charge incurred against the stored-value card account number to confirm the health care provider has been paid for the services approved by the administrator.

5. The method of claim 2 wherein the stored-value card account number is chargeable only through a medical services terminal.

6. A method of facilitating payment of adjudicated health care benefits to a health care provider on behalf of a payer comprising the steps of:

loading a unique, single-use, stored-value card account with an amount equal to a single, authorized benefit payment, the card account only chargeable through a medical services terminal;

generating an explanation of benefits associated with the payment;

creating a computer-generated image file containing the stored-value card account number, the amount, a card verification value code, an expiration date, and the explanation of benefits;

transmitting the image file by a computer-implemented electronic transmission medium selected from the group consisting of fax, SMTP, SMS, MMS, HTTP, HTTPS, and FTP to the health care provider wherein the electronic transmission includes a computer-generated image of a physical card; and reconciling the charged card account to confirm that the health care provider has received payment.

*7. A method of facilitating payment of adjudicated health care benefits to a health care provider on behalf of a payer comprising the steps of:*

*loading a unique, single-use stored-value card account by one or more computers with an amount equal to a single, adjudicated benefit payment, generating an explanation of benefits associated with the payment;*

*creating a computer-generated file containing the stored-value card account number, the adjudicated benefit payment amount, a card verification value code, an expiration date, and the explanation of benefits by one or more computers; and*

*transmitting the file by one or more computers to the health care provider.*

*8. The method of claim 7 further comprising the step of reconciling the charged card account to confirm that the health care provider has received payment.*

*9. The method of claim 7 further comprising the step of providing a computer-generated image of a physical card in the transmitted file.*

*10. The method of claim 7 wherein the transmitted file is sent by computer-implemented electronic transmission medium selected from the group consisting of fax, SMTP, SMS, MMS, HTTP, HTTPS, and FTP.*

*11. The method of claim 7 wherein the stored-value card account is only chargeable through a medical services terminal.*

*12. A system for payment of adjudicated health care benefits combining payment terms and an explanation of benefits, the system comprising:*

*an explanation of benefits describing medical services provided to a patient by a health care provider, an amount billed by the health care provider and an amount paid by the patient's insurance company; and*

*a payment mechanism associated with the explanation of benefits, the payment mechanism merging a stored-value card account number, an adjudicated benefit payment amount, a card verification value code, and an expiration date with the explanation of benefits into a document by one or more computers;*

*wherein the stored-value card account number is linked to a unique, single-use stored-value card account prefunded with an amount equal to a single, adjudicated benefit payment, and wherein the document is electronically transmitted to the health care provider as payment for the medical services by said one or more computers.*

*13. The system of claim 12 wherein the charged card account is reconciled to confirm that the health care provider has received payment.*

*14. The system of claim 12 wherein a computer-generated image of a physical card is provided in the electronically transmitted document.*

*15. The system of claim 12 wherein the electronically transmitted document is sent by computer-implemented electronic transmission medium selected from the group consisting of fax, SMTP, SMS, MMS, HTTP, HTTPS, and FTP.*

*16. The system of claim 12 wherein the stored-value card account is only chargeable through a medical services terminal.*

*17. A computer implemented method for combining payment of adjudicated health care benefits with an associated explanation of benefits, the method comprising:*

*receiving an explanation of benefits related to medical services provided by a health care provider*

*receiving authorization to pay at least a portion of submitted charges associated with the explanation of benefits and the associated funds for payment;*

*funding a unique, single-use stored-value card account with an amount equal to the adjudicated benefit payment by one or more computers;*

*merging the explanation of benefits with the stored-value card account number, the adjudicated benefit amount of payment, a card verification value code, and an expiration date in an electronic file by said one or more computers; and*

*electronically sending the merged file to the health care provider as payment for the services by said one or more computers.*

*18. The method of claim 17 wherein the charged card account is reconciled to confirm that the health care provider has received payment.*

*19. The method of claim 17 wherein a computer-generated image of a physical card is provided in the merged file.*

*20. The method of claim 17 wherein the merged file is sent by computer-implemented electronic transmission medium selected from the group consisting of fax, SMTP, SMS, MMS, HTTP, HTTPS, and FTP.*

*21. The method of claim 17 wherein the stored-value card account is only chargeable through a medical services terminal.*

*22. A system for payment of adjudicated health care benefits to a health care provider, the system comprising:*

*an administration system operable to receive a benefit claim from the health care provider and to generate an explanation of benefits for the benefit claim along with an approved payment; and*

*a card processing system operable to fund a single-use stored-value card account with an amount equal to the approved payment by one or more computers, the card processing system also operable to merge the explanation of benefits with the stored-value card account number by one or more computers, the adjudicated amount of payment, a card verification value code, and an expiration date in an electronic file and to send the electronic file to the health care provider as payment for the benefit claim by one or more computers.*

*23. The system of claim 22 wherein the charged card account is reconciled to confirm that the health care provider has received payment.*

*24. The system of claim 22 wherein a computer-generated image of a physical card is provided in the electronic file.*

*25. The system of claim 22 wherein the electronic file is sent by computer-implemented electronic transmission medium selected from the group consisting of fax, SMTP, SMS, MMS, HTTP, HTTPS, and FTP.*

*26. The system of claim 22 wherein the stored-value card account is only chargeable through a medical services terminal.*

* * * * *

UNITED STATES PATENT AND TRADEMARK OFFICE

CERTIFICATE OF CORRECTION

PATENT NO. : RE43,904 E
APPLICATION NO. : 13/358620
DATED : January 1, 2013
INVENTOR(S) : Robert Allen It is certified that error appears in the above-identified patent and that said Letters Patent is hereby corrected as shown below:

In the Specification

Column 1, line 15, above the heading, "FIELD OF THE INVENTION" insert:
--Notice: More than one reissue application has been filed for the reissue of patent 7,792,686. The latest application which has been filed, 13/715,053, is a continuation reissue of this application, 13/358,620, which has now issued as U. S. Patent No. RE43,904.--

Signed and Sealed this
Fifteenth Day of October, 2013

Teresa Stanek Rea
*Deputy Director of the United States Patent and Trademark Office*